United States Patent [19]

Towson et al.

[11] 3,827,027

[45] July 30, 1974

[54] METHOD AND APPARATUS FOR PRODUCING VARIABLE FORMATS FROM A DIGITAL MEMORY

[75] Inventors: Glendon D. Towson; James H. Koberlein, both of Garland, Tex.

[73] Assignee: Texas Instruments Incorporated, Dallas, Tex.

[22] Filed: Sept. 22, 1971

[21] Appl. No.: 182,674

[52] U.S. Cl. ........... 340/172.5, 343/5 DP, 343/5 SC

[51] Int. Cl. ............................ G11c 7/00, G01s 9/00

[58] Field of Search ...... 340/172.5; 343/5 DP, 5 SC

[56] References Cited

UNITED STATES PATENTS

| | | | |
|---|---|---|---|
| 3,331,056 | 7/1967 | Lethin et al. | 340/172.5 |
| 3,360,779 | 12/1967 | Ulrich | 340/172.5 |
| 3,477,064 | 11/1969 | Hilgendorf et al. | 340/172.5 |
| 3,522,597 | 8/1970 | Murphy | 340/172.5 |
| 3,555,520 | 1/1971 | Helbig et al. | 340/172.5 |
| 3,571,807 | 3/1971 | Candy et al. | 340/172.5 |
| 3,599,178 | 8/1971 | Jackson et al. | 340/172.5 |
| 3,602,702 | 8/1971 | Warnock | 340/172.5 |
| 3,638,199 | 1/1972 | Kolankowski et al. | 340/172.5 |

*Primary Examiner*—Gareth D. Shaw

[57] ABSTRACT

A method and system are disclosed in which radar data are collected, integrated to improve the signal quality and stored in a random access digital memory. The addressing sequences for storing the data in the digital memory are selected such that the data can be read and used to update a display without requiring complicated transformations of the address sequences used to store the data into the address sequences for reading the data. The digital memory also provides true freeze mode operation of the display. The system can also be used to display infrared scanner data.

6 Claims, 8 Drawing Figures

METHOD AND APPARATUS FOR PRODUCING VARIABLE FORMATS FROM A DIGITAL MEMORY

DESCRIPTION OF THE INVENTION AND BACKGROUND INFORMATION

This invention relates to display systems and methods and more particularly to displays which are updated by reading data stored in a digital memory.

Typical prior art display systems which were updated from data stored in a digital memory and used in conjunction with systems, such as radar, in which the data as collected was in polar form ($\rho,\theta$), required complicated mathematical computations to convert the memory address sequences used in storing the data to an address sequence for reading the data for the purpose of updating the display. This complication was related to the fact that the data was collected using a polar coordinate system and displayed on a cathode ray tube using a linear $x$–$y$ coordinate system using a raster similar to conventional television.

To aid in an understanding of the invention, a brief discussion relating thereto will be presented. The display system according to the present invention eliminates the complicated mathematical procedures required by the above-discussed prior art display systems. These problems are solved by collecting, storing and displaying the data in polar form. In a radar system, for example, this is accomplished by dividing the area to be scanned by the radar antenna and the associated display into a number of equal sized azimuth (angular) segments and dividing the range to be covered by the radar into a number of equal sized range segments. The intersection of an azimuth and a range segment identifies a scan segment. This divides the area scanned by the radar antenna and any display associated with the particular radar system into a discrete number of uniquely identified scan segments. The size of the scan segments are selected to give the system the desired resolution. The video data related to each of the scan segments is stored in a cell of a random access digital memory as a data word.

In storing the data, all the signal returns received during one azimuth scan segment are integrated to form a composite signal. The composite signal is then stored in a random access digital memory at locations identified by a group of addresses generated using an address counter having two parts. During the store cycle in which the composite signal for one azimuth scan segment is being stored, the first part of the address counter is incremented through all its values to identify a group of memory locations allocated for storage of data from one azimuth scan segment. After the data belonging to one azimuth scan segment has been stored the second part of the address is incremented one count and the above procedure repeated to store the data belonging to the next azimuth scan segment in a second group of memory locations. The above procedure is sequentially repeated to store data from all azimuth scan segments as the data is received. When data from all azimuth scan segments have been stored, the address counter is reset to zero and a new store cycle initiated to continuously update the data stored in the digital memory.

In reading data for updating the display, a second sequence of addresses is used. This sequence of addresses is generated using a second address counter also having two parts. The first part of the address counter is incremented through all its possible values to generate addresses identifying the storage locations of all data belonging to one range segment. The second portion of the counter is then incremented one count and the above procedure is repeated to generate addresses identifying the storage location of all the data belonging to the next range segment. The data stored in each of the memory locations identified by the above discussed memory address sequences are read and used to update a display as each address of the sequences is generated. This procedure is sequentially repeated to read all the data stored in the digital memory and update the display. After all the stored data has been read the address counters are reset to zero and the above procedure repeated to continuously update the display.

There is no complicated computation required to generate the read address sequence from the write address sequence because they are generated in two independent sets of address counters. The address sequences are only related through the organization of the data storage and data display formats. These formats are selected such that the address sequence for both storing and reading data can be generated by independent digital counters. In the above discussed embodiment the data are collected, stored and displayed using a polar-type coordinate system. That are, the data is collected in the $\rho$, $\theta$ coordinate system and read out of the memory and displayed in the $\theta,\rho$ coordinate system. Other formats could also be used.

In one embodiment of the invention the above described address counters are modified to provide for the storage of data words belonging to more than one azimuth scan segment in each digital word of the digital memory. This modification will be subsequently described in detail.

Since the data are stored in memory true "freeze mode" operation is possible by inhibiting updating of the memory.

Accordingly it is an object of the invention to provide a method and apparatus for collecting data for storage in a memory in one coordinate system and for reading out of that memory the data in a second coordinate system.

Another object of the invention is to provide a display system in which data can be collected and stored in a digital memory and read to update a display using address sequences generated by a digital counter.

Another object of the invention is to provide a method of storing and displaying data in which the data are stored in a digital memory using an address sequence generated by a first counter and in which the data are read and displayed using an address sequence generated by a second counter.

Another object of the invention is to provide a radar system in which the video data can be stored in a digital memory and read from the memory to update a display without complicated mathematical transformations between the memory address sequence used in storing the data and the address sequence used in reading data.

Another object of the invention is to provide a radar display system having a "freeze mode" in which the quality of the display does not deteriorate with time.

These and other objects of the invention will be better understood in view of the following detailed description and the attached drawings.

DETAILED DESCRIPTION

Figure 1:
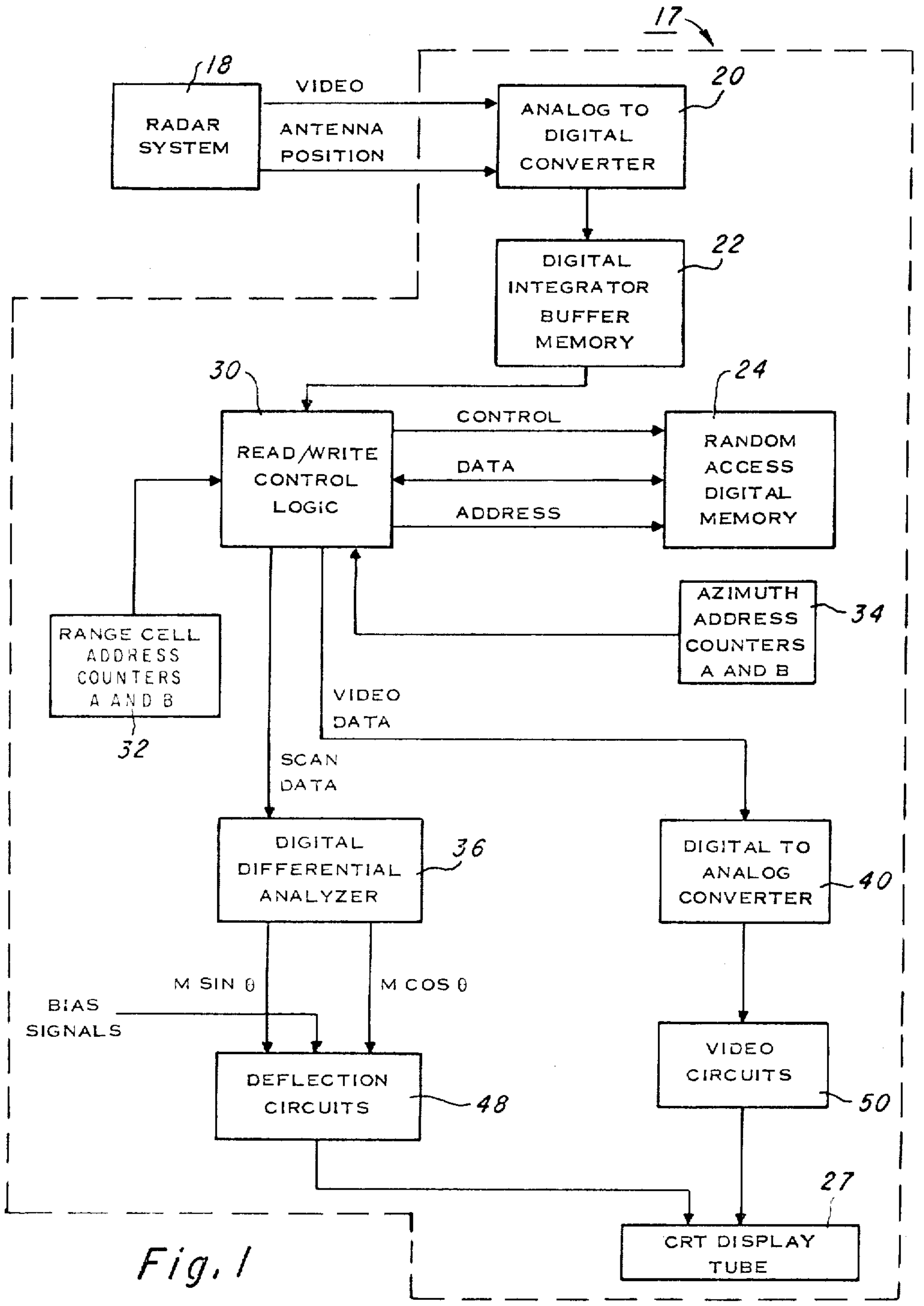
FIG. 1 is a functional block diagram of the system.

Referring now to FIG. 1 which is a functional block diagram of the system, it can be seen that the display system 17 includes an analog to digital converter 20, a digital integrator and buffer 22, a random access digital memory 24, a digital differential analyzer 36, a digital to analog converter 40, and a display cathode ray tube 27. A suitable digital integrator is disclosed in U.S. Pat. No. 3,422,435.

In the following detailed description, it is assumed that the display system is to be used to display video data from a radar system 18. An exemplary radar system 18 will be assumed to have the following characteristics:

a. Minimum radar pulse width equals 0.25 microsecond.

b. Maximum radar range equals 10 nautical miles.

c. Display format is depressed center PPI.

d. The scan coverage is 90°.

e. The radar beam width is equal to 3° and the scan rate is equal to 180° per second.

f. The radar pulse is equal to 4,096 pulses per second.

g. The dynamic range of the receiver is equal to 24db.

For purposes of illustration, the display system 17 coupled to the above described radar system 18 will be assumed to have the following characteristics:

a. Number of range segments equals 512.

b. Number of scan segments equals 128.

c. Number of gray shades equals 8 (three binary bits per data word).

d. Memory bit capacity equals the number of range segments times the number of scan segments times the number of bits in each of the range cells or 196,608 bits organized in 8,192 words of 24 bits each.

e. Cycle time of memory 0.6 microsecond.

f. Field rate of display is 60hz. (A display field is generated by updating each of the display segments 24 (FIG. 2) comprising the display.)

Figure 2:
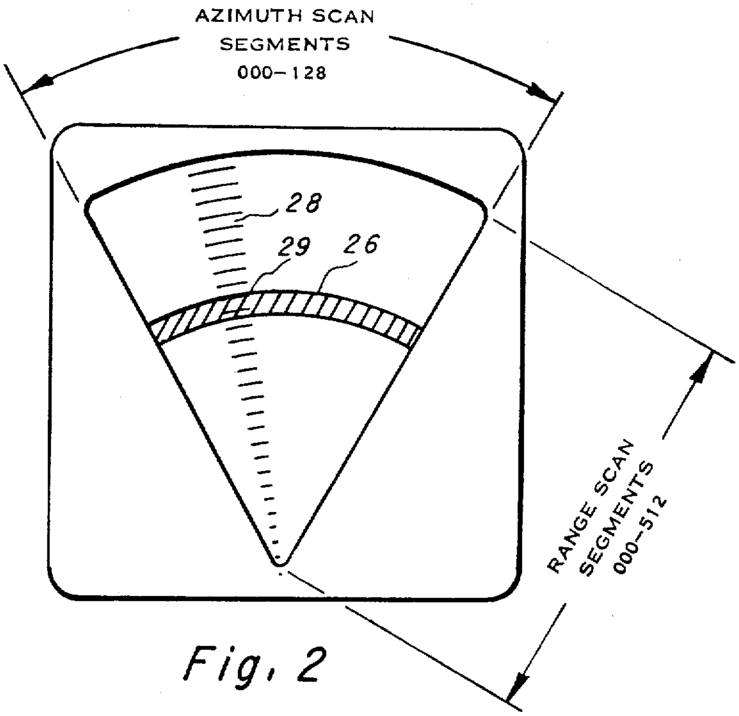
FIG. 2 is a diagram of a depressed center PPI display.

The display system 17 which is discussed in detail as an example of one embodiment of the invention will be coupled to the above-described radar system 18 and displays the video data generated by the radar system 18 in a depressed PPI format. In order to facilitate displaying the video data in this format the fan-shape depressed PPI display format illustrated in FIG. 2 is divided into 512 range scan segments 26, and 128 azimuth scan segments 28. The intersection of any range segment with any azimuth segment defines a unique area on the display. Each area so defined is called a display segment 29.

In operation the radar system 18 generates and sends to the analog to digital converter 20, which may be a Texas Instruments Incorporated analog-to-digital converter, CV-2618/APQ 99, information indicative of the antenna position of the radar system 18 and video signals representative of the return signals detected by the radar receiver. All the video signals received during one azimuth scan segment 28 are digitized by the analog to digital converter 20 and integrated by a digital integrator 22 to produce a composite video signal. The integration results in 512 digital data words which are stored in a buffer memory which is included in the digital integrator 22. After all 512 data words are stored in the buffer memory they are transferred into 256 sequential locations in the random access memory 24. A suitable memory is Series No. 480 sold by Fabri-Tek Incorporated. (The method used to store 512 data words in 256 sequential memory locations will be discussed in detail later). The above process is repeated for all 128 azimuth scan segments 28 with the antenna position information from the radar indicating to the display system 17 which azimuth scan segment 28 is associated with the data currently being received and integrated to produce the composite signal.

The antenna position information from the radar may be of many forms. Typical signals include an AC signal from a servo transmitter or a DC signal whose amplitude has a predetermined relationship to the position of the radar antenna. In some applications the DC signal is more convenient because it can be digitized by the same analog to digital converter 20 as used to digitize the video signal thereby simplifying the display system.

The random access memory 24 may be a x–y addressed memory operating in the read-modify-write mode. In the discussed embodiment the memory has 8,192 words of 24 bits each and a cycle time of 0.60 microseconds.

Figure 3:
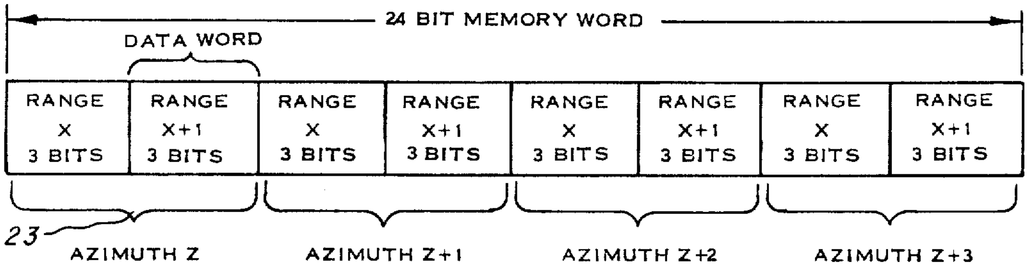
FIG. 3 is a diagram showing how the words of the digital memory are organized.

Referring to FIG. 3, each of the 24 bit memory words is divided into four six bit groups 23 and each group is assigned to four ($z$ to $z + 3$) sequential azimuth segments 28 (FIG. 2). Each of the groups is divided into two three bit portions (data words) with the data words being equally divided between two ($x$ and $x+1$) adjacent range segments 26. Thus, each word in the random access memory 24 will contain digitized video data belonging to eight contiguous display segments 29 with the display segments being distributed between two adjacent range segments 26 and four adjacent azimuth segments 28. This organization permits two data words belonging to two adjacent range segments 26 and to a common azimuth scan segment 28 to be stored or four data words belonging to one range scan segment 26 and four adjacent azimuth scan segments 28 to be read for purposes of updating the display during a memory cycle, thereby reducing the memory cycle time.

The read/modify/write cycle of the random access digital memory 24 is used to transfer data words from the buffer memory in the digital integrator 22 into the random access digital memory 24. In this mode of operation the data stored in the random access digital memory 24 at an address specified by address counters 32 and 34 (FIG. 1) is read, new data substituted for a portion of the word read from the random access digital memory 24 to form a reconstituted word which is stored in the same location from which the original word was read.

Since all the data stored in the buffer memory of digital integrator 22 belongs to a single azimuth scan segment 28, each of the read/modify/write memory cycles can be used to store two new data words belonging to two adjacent range scan segments 26 during each memory cycle. For example, to update the random access digital memory 24 to store new data related to azimuth segment "*z*" (illustrated in FIG. 3), the entire 24 bits of data will be read from the random access memory 24 and the two data words assigned to azimuth scan segment "*z*" and range scan segments "*x*" and "*x*+1" would be replaced by two new data words from the buffer memory to form a reconstituted data word which is stored in the random access digital memory 24 in the same location from which the 24 bit word was originally read. This permits two new data words to be stored every memory cycle.

A feature to be considered when selecting the memory cycle is that the video data must be stored in realtime and that the PPI display of FIG. 2 must be updated at a rate of at least 60hz to prevent objectionable flicker. The display may also be organized such that alternate range segments 26 are displayed during each display update cycle with the range segments 26 updated during alternate update cycles and interleaved to complete the display.

In the radar system 18 used as an example, the radar receiver has a 24db dynamic range resulting in a resolution of approximately 8 gray scales. Each of the digital words representing the video data must be at least 3 bits in order to represent 8 gray scales without loss of resolution. Since the antenna will scan one complete cycle in one-half second and the repetition rate of the radar is 4,096 pulses per second, 2048 transmit pulses will occur within one complete scan cycle. Since there are 128 azimuth scan segments 28, 16 signal returns will be integrated by the digital integrator 22 to produce the composite video signal for each of the azimuth scan segments 28.

The signal returns received by the radar system during each azimuth scan segment 28 are integrated by the digital integrator 22 to produce a composite signal consisting of 512 data words containing 3 bits each. These data words are stored in the buffer memory, as previously discussed, until the integration cycle has been completed. When the integration cycle is complete, a signal is generated by the digital integrator 22 indicating that the buffer is full. This signal inhibits further reading of the data from the random access digital memory 24 for purposes of updating the display for a time period equal to 256 read/modify/write cycles of the random access digital memory 24, during which the 512 data words stored in the buffer memory are transferred into the random access digital memory 24. True freeze mode operation in which the quality of the display does not decrease with time is possible by inhibiting updating of the digital memory 24.

Figure 4:
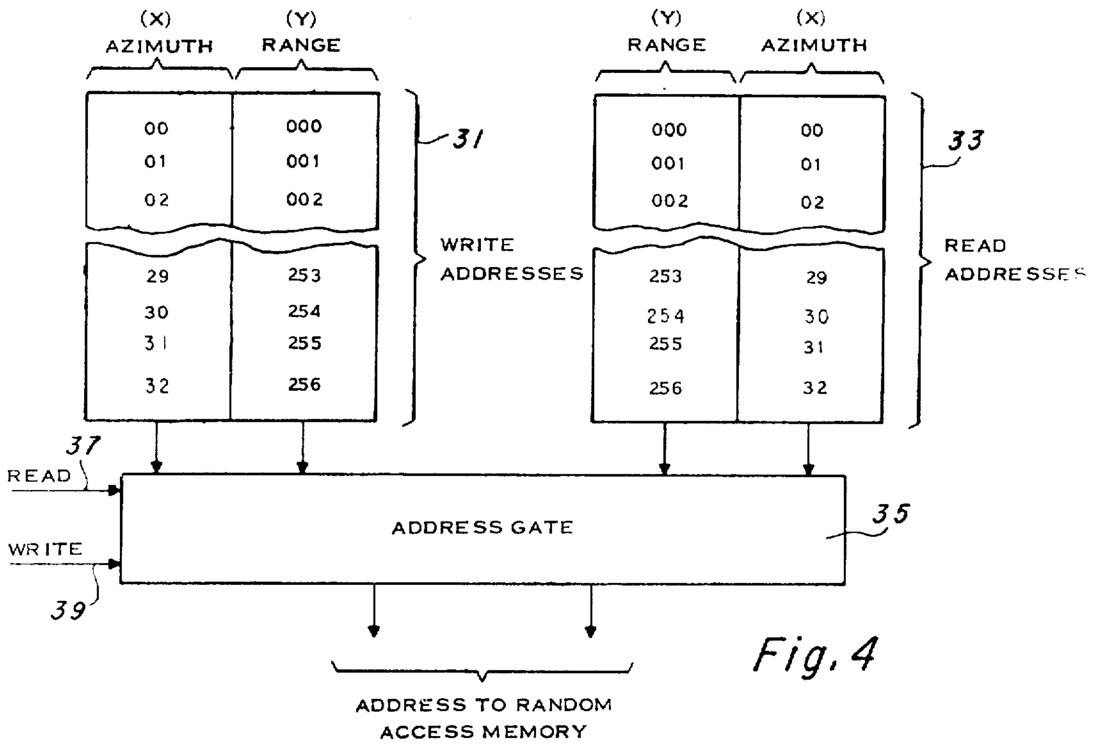
FIG. 4 is a drawing showing the organization of the read and write addresses of the memory and a gate to select the memory address.

Referring now to FIG. 4, a group of write addresses 31 and a group of read addresses 33 are shown. The write addresses 31 are used to store the video data in the random access memory 24 and the read addresses are used in reading the video data words from the random access memory 24 to update the display. The addresses are coupled to the random access digital memory 24 through an address gate 35. The address gate 35 couples either the write addresses or the read addresses, 31 and 33, respectively to the random access memory 24, with the group of addresses to be coupled selected by read or write signals, 37 and 39. The reason for designating portions of the addresses azimuth and range will be explained in a later discussion of the organization of the random access digital memory 24.

Figure 4A:
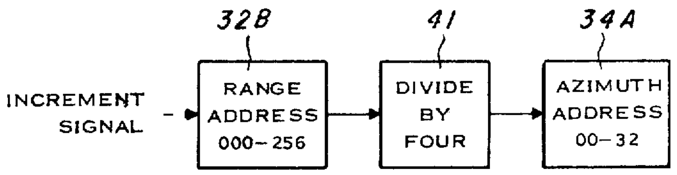
FIG. 4A are a diagram of counters for generating an address sequence specifying memory locations at which data is stored.
Figure 4B:
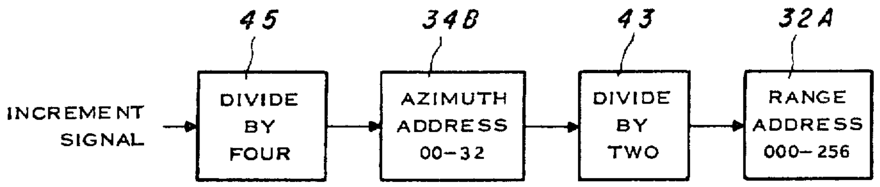
FIG. 4B is a diagram of counters for generating an address sequence specifying memory locations from which data are read.

The address sequence, used for storing data in the random access digital memory 24, is generated by two counters, 32B and 34A, interconnected as shown in FIG. 4A. The address sequence used for reading data from the random access digital memory 24 is generated by two counters, 32A and 34B, interconnected as shown in FIG. 4B. The output signals of these counters are coupled to the random access digital memory 24 by read/write control logic 30 and address gate 35. Divide circuits 41, 43 and 45 determine what portion of each of the 24 bit memory words will be updated during each store cycle and select a data word from the 24 bit memory word to update the display. The functions of these circuits will be explained in detail later.

Two complete sets of address counters, 32 and 34, are desirable because each time the digital integrator 22 generates a signal indicating that the buffer memory is full, updating of the display must be inhibited while the data stored in the buffer memory is transferred into the random access digital memory 24. After the data transfer is complete, it is desirable that the display cycle restart from the point where it was interrupted. This requires that either two sets of address counters, one for storing data and one for reading data, be used or some means for storing the read address, at which the display cycle was interrupted must be provided. Generally, the simplest solution is to provide two complete sets of address counters.

The generation of the address sequence 31 used for transferring data from the buffer memory to the random access digital memory 24 will now be explained in detail. When the display system is energized, all the address counters 32A, 32B, 34A and 34B, and the divide circuits 41, 43 and 45 are set to zero. Updating of the random access digital memory 24 is inhibited until a signal is received by the read/write control logic 30 from the digital integrator 22 indicating that the buffer memory contains data collected from an area defined by the intersection of azimuth scan segment 000 and range scan segments 000–512. The data stored in the buffer memory are then transferred to and stored in the random access digital memory 24 at a group of addresses corresponding to positions between 000 (azimuth) 000 (range) and 000 (azimuth) 256 (range) using bit positions within the memory word assigned to azimuth segment "*z*" (FIG. 3). This group of addresses is generated by incrementing counter 32B one count after each memory read/write/modify/write cycle. The divide by four circuit 41 determines which azimuth scan segment ($z$ through Z+3, FIG. 3) the data belongs.

The divide by four circuit 41 increments one count as the range counter 32B resets to 000. When the next signal indicating that the buffer memory is full is received by the read/write control logic 30 from the digital integrator 22, the data stored in the buffer memory is transferred to and stored in the random access digital memory at a group of addresses corresponding to positions between 000 (azimuth) 000 (range) and 000 (azimuth) 256 (range) using bit positions within the memory word assigned to azimuth segment "$z + 1$." The bit positions used to store the data are determined by divide by four circuit 41. This second transfer cycle transfers all the data collected from an area defined by the intersection of azimuth scan segment 001 with range scan segments 000–512. When four store cycles are completed in accordance with the above procedure, the divide by four circuit 41 increments the azimuth counter 34A one count to identify a new group of memory addresses. The store cycle is then repeated using an address sequence generated by the above described procedure until all the memory locations have been updated at which time the range counter 32B, the divide by four circuit 41 and the azimuth counter 34A are reset to zero. The above described memory update cycle is sequentially repeated as new data is generated by the radar system 18 and the digital integrator 22 to continuously update the random access digital memory 24.

From the above discussion it can be seen that the range counter 32B and the azimuth counter 34A generate the address sequence 31 (FIG. 4) and that the divide by four circuit 41 determines what portion of the memory word will be used to store the data being transferred from the buffer memory to the random access digital memory 24.

The generation of the read address sequence 33, (FIG. 4) used in reading data from the random access digital memory 24 for purposes of updating the display will now be explained in detail. When the display system is energized, the azimuth address counter 34B, the range address counter 32A, the divide by two circuit 43 and the divide by four circuit 45 are reset to zero. The azimuth address counter 34B is incremented through a divide by four circuit 45 to generate a group of addresses corresponding to positions between 000 (range) 000 (azimuth) and 000 (range) 32 (azimuth). The above cycle is repeated two times causing the divide by two circuit 43 to increment the range address counter 32A to generate a second group of addresses corresponding to position between 001 (range) to 00 (azimuth) and 001 (range) 32 (azimuth). When the azimuth address counter 34B resets from 32 to 00 the divide by two circuit 43 is incremented one count. The above procedure is sequentially repeated to generate all the addresses contained in address sequence 33 (FIG. 4). The divide by four circuit 45 indicates which azimuth scan segment ("$z$" through "$z + 3$") is being updated, the divide two circuit 43 which range scan segment ("$x$" or "$x + 1$," FIG. 3) is being updated and the range and azimuth address counters, 32A and 34B, indicate the address in the random access digital memory 24 where the data belonging to these segments is stored. Each time the divide by four circuit 45 is incremented a new display segment 29 is updated and each time the azimuth address counter 34B is incremented a new digital word is read from the digital memory 24. The above procedure is repeated to continuously update the display at a rate sufficient to reduce the flicker rate of the display to an acceptable level.

From the above discussion it can be seen that the sequence of addresses 33 for reading data can be generated from the sequence of addresses 31 used in storing the data by interchanging the azimuth and range portion of the sequence of addresses 31 used in storing the data. This is a simple process which can be performed using the above discussed combination of counters and divide circuits. This totally eliminates complicated arithmetic computations common to prior art display systems.

The depressed center PPI display (FIG. 2) is generated by deflecting the electron beam of a cathode ray tube so as to generate a series of range rings on the cathode ray tube with each range ring corresponding to a range segment 26 (FIG. 2). The data words are read from the random access memory 24, converted to an analog signal which modulates the electron beam of the cathode ray tube, to complete the display.

Figure 5:
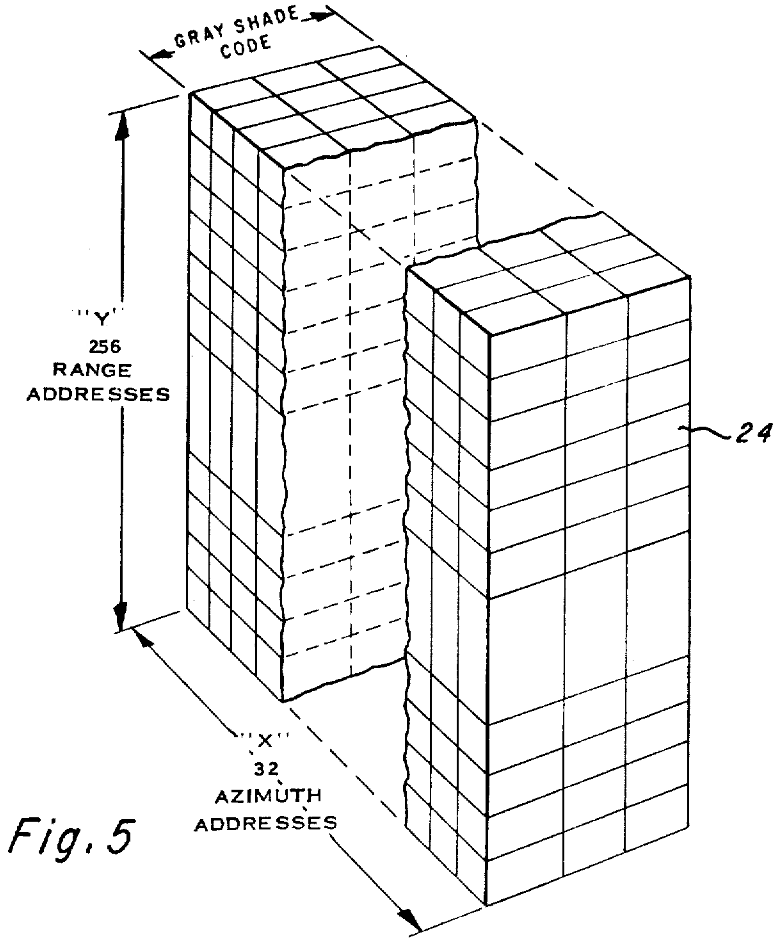
FIG. 5 is an isometric diagram of a digital memory.

FIG. 5 illustrates diagrammatically the organization of the random access digital memory 24. The memory is addressed in the conventional $x$–$y$ coordinate system with the "$x$" direction being labeled "azimuth" addresses and the "$y$" direction being labeled the "range" addresses. The "$x$" coordinates of the memory addresses are labeled "azimuth" because any group of memory addresses in which the "$x$" coordinate is variable and the "$y$" coordinate is fixed identifies a group of memory addresses in which all the data belonging to an azimuth scan segment 28 is stored. Conversely, the "$y$" coordinates of the memory addresses are labeled "range" because any group of memory addresses in which the "$y$" coordinates are variable and the "$x$" coordinates are fixed identifies a group of memory addresses in which all the data belonging to a range scan segment 26 is stored. As previously explained the words of the digital memory may also be organized such that data belonging to more than one range and azimuth scan segments, 26 and 28, can be stored in each memory location. This does not conflict with the above definition for the "$x$" and "$y$" coordinates of the memory addresses. It is merely a multiple use of each memory word. This can be seen from the organization of the memory word (FIG. 3) previously discussed.

The random access digital memory 24 as illustrated contains 8,192 twenty-four bit memory words and has 256 "$y$" addresses and 32 "$x$" addresses. Alternately, the memory can be organized to contain more or less bits per word by modifying the number of memory words.

The digital integrator 22 contains a 512 word buffer memory having a word length of three bits. This memory is used to store the digital information from each azimuth scan segment 28 so that this information can be transferred into the random access memory 24 in one block. This simplifies the control of the random access memory 24 and the coordination of the store function with the read functions of the random access digital memory 24.

The random access memory 24 is controlled by read/write logic 30. The read/write logic receives information from the digital integrator 22, the range address counters 32 and the azimuth address counters 34. The read/write control logic also includes the address gate 35, illustrated in FIG. 4. The number of bits required for the range address counters and the azimuth address counters will depend on the number of memory word in the random access digital memory 24 and in general is a function of the particular application. In general two independent sets of address counters will be included. One set of counters will be used to address the random access digital memory 24 for the store function and the second set for the read function. This eliminates any problem which may exist in resetting the address counters at the termination of either a read or write cycle.

Figure 6:
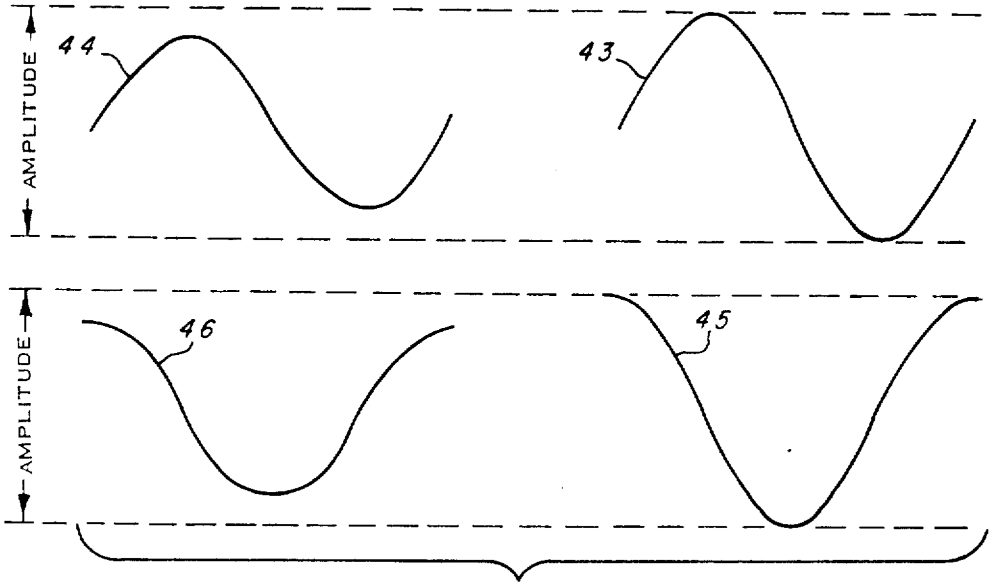
FIG. 6 is a diagram illustrating the relationship between the range segment of the display being updated and the amplitude of the sine and cosine waves which are coupled to the deflection circuits of the display cathode ray tube.

The read/write logic 30 supplies control signals to the random access digital memory 24. The exact nature of these signals will of course depend on the random access digital memory 24 selected, but in general will include a start pulse and signals which check to determine when the read/write cycles of memory have been completed. It is to be understood that the design of the logic circuit is within the knowledge of those skilled in the art and others are referred to the books of H. S. Torng, "Logical Design of Switching Systems," and William and Taub, "Pulse Digital and Switching Waveforms" for a detailed disclosure of the circuit and logic design procedures. The data to be stored in each of the memory locations may be supplied to the random access memory 24 over a cable. The data will generally be supplied to and read from the memory in parallel and thus this cable will include a separate line for each bit of the memory word. Signals specifying the memory address where data are to be stored or read from are also supplied by the read/write control logic 30. This information is generally in parallel and will include an individual line for each bit of the azimuth and range address counters, 32 and 34. The read/write control logic 30 also supplies digital data to a differential analyzer 36 and to a digital to analog converter 40. A suitable digital to analog converter is a Burr-Ground Incorporated DAC20-08U-USB converter. The function of the digital differential analyzer 36, which is described by Braun in his book "Digital Computer Principles," Chapter 8, is to generate two analog signals with one being a sine wave and the other being a cosine wave. The sine wave is illustrated generally at reference numeral 44 in FIG. 6 while the cosine is illustrated generally at reference numeral 46. The sine and cosine waves are coupled to deflection circuits 48 (FIG. 1) described in detail in "Electronics Design" Mar. 15, 1966, page 215. The sine function 44 drives a vertical deflection circuit while the cosine function drives a horizontal deflection circuit to produce concentric circles corresponding to the range segments 26 (FIG. 2) on the CRT display 27. The differential analyzer 36 is controlled by the range and azimuth address counters 32 and 34 so that the deflection circuits of the display are properly coordinated with the video signals. The analog output signal of the digital to analog converter 40 is coupled to the video circuits 50. The video circuits 50, described in "Television Engineering Handbook," Chapter 8, intensity modulate the cathode ray display tube 27 in accordance with the signal output from the digital to analog converter 40. A suitable cathode ray tube display tube is a Westinghouse Electric Corporation Tube No. 5CEP.

The range segment being displayed on the display CRT 27 is determined by the amplitude of the sine and cosine waves coupled to the deflection circuits 48. The low amplitude of these signals cause the electron beam of the CRT display tube 27 to be near the center of the display cathode ray tube 27 corresponding to a low range. Increasing the amplitude of these signals causes the electron beam of the display cathode ray tube 27 to be deflected farther from the center of the tube corresponding to a longer range. This change in amplitude is illustrated generally in FIG. 6 where the amplitudes corresponding to a low range are illustrated generally at reference numerals 44 and 46 and the amplitudes corresponding to a higher range are illustrated generally at reference numerals 43 and 45.

By sequentially varying the amplitudes of the cosine and sine waves in response to the address counters specifying the memory location from which data to be displayed is read, the electron beam of the CRT can be deflected to scan the face of the CRT in the desired pattern. Converting the digital data words to an analog signal and coupling the analog signal to the video circuits 50 to intensity modulate the beam of the CRT causes the radar return signals to appear as high intensity areas on the CRT. The position of these high intensity areas is indicative of the range and bearing of the object producing these signals with respect to the radar system 18.

The display system may also be used with other systems generating video data, for example infrared scanner systems.

Biasing the deflection circuits 48 by applying bias signals to bias signal input lead 54 causes the center of the pattern to be moved off the center of the CRT display tube. Controlling the sine and cosine waves so that only portions of the cycles are generated limits the scanning of the CRT to less than 360° to generate the depressed PPI pattern illustrated in FIG. 2. The disclosed display system could be modified to generate other display formats.

Although the system has been described and defined with reference to preferred embodiments it will be obvious to those skilled in the art that many modifications of the system may be made all of which will be within the scope of the invention as disclosed and defined.

We claim:

1. In a display system receiving antenna position information and video signals for digitization, wherein an analog to digital converter and digital integrator digitizes and integrates the video signals into composite signals for a buffer memory and produces a buffer full signal and wherein a buffer memory stores the composite signals for each azimuth segment scan for display by cathode ray tube, the combination with said buffer memory of a read/write control logic circuit, a random access digital memory and a read/write address means having independent counters operably responsive to the read/write control logic circuit upon receipt of the buffer full signal for producing separate sequences to provide distinct formats for transferring in a write sequence the composite signals stored in the buffer memory into a plurality of sequential locations in the random access digital memory with the antenna position information from the radar indicating the azimuth scan segment associated with the composite signals being transferred, and reading from the random access digital memory in a read sequence distinct from that of the write sequence the composite signals for display whereby, for example, the data are collected in the polar coordinate system in one manner and read out of the random access digital memory in a different manner and displayed in the polar coordinate system.

2. In a display system according to claim 1, wherein the read/write address means comprises: a range cell counter and an azimuth counter, and a read address position indicating storage means, said range cell counter and azimuth counter providing write addresses for the storage of composite signals in the random access digital memory upon receipt of the buffer full condition signals and read addresses upon the absence of a full buffer condition signal, and said read address position indicating storage means storing the read address at which the cathode ray tube display was interrupted whereby the cathode ray tube display is restarted from the point where interrupted for the storage of data in the random access digital memory.

3. In a display system according to claim 1, wherein the read/write address means comprises: write range cell and azimuth counters and read azimuth and range cell counters, said write range cell and azimuth counters upon receipt of a buffer full condition signal providing coordinate address sequences for the storage of composite signals in the random access digital memory, and said read azimuth and range cell counters providing read addresses for reading the composite signals from the random access digital memory.

4. In a display system according to claim 3, wherein the write counters provide address words for writing the composite signals of the buffer memory into the random access digital memory, the address words comprising word segments for a first group of addresses corresponding to the azimuth scans and word segments for a second group of addresses corresponding to the plurality of range scan segments for each azimuth scan, and the read counters provide read address words comprising word segments for a first group of read addresses corresponding to the range scans and word segments for a second group of addresses corresponding to the plurality of azimuth scan segments, whereby, for writing composite signals into the random access digital memory, a plurality of azimuth locations and range locations for each azimuth location are sequentially addressed to store any composite signals at a range scan segment associated with the respective azimuth scan, and, for reading composite signals from the random access digital memory, a plurality of memory range locations and azimuth locations are sequentially addressed to read any composite signals from an azimuth scan segment associated with the respective range scan.

5. In a display system according to claim 4, wherein the read/write address means comprises for the write addresses a range counter and an azimuth counter coupled to a divide-by-four circuit, said range counter and azimuth counter operative to generate a write address word sequence, and said divide-by-four circuit operative to determine the portion of the address memory word used to store the data being transferred from the buffer memory to the random access digital memory.

6. In a display system according to claim 4, wherein the read/write address means comprises for the read address an azimuth address counter coupled to a divide-by-four circuit for generating a group of addresses indicating the azimuth scan segment being read, and a range address counter coupled to a divide-by-two circuit for generating a group of addresses indicating the range scan segment being read, said read/write address counters operative to indicate the address in the random access digital memory where the composite signals are stored.

* * * * *